United States Patent [19]

Evans

[11] 3,903,617
[45] Sept. 9, 1975

[54] EDUCATIONAL DEVICE

[76] Inventor: Jetta Sue Evans, 1105 E. Main St., Clarksburg, W. Va. 26301

[22] Filed: Sept. 14, 1973

[21] Appl. No.: 397,384

[52] U.S. Cl.................................. 35/35 J; 35/71
[51] Int. Cl. ...................................... G09b 17/00
[58] Field of Search........... 35/35 R, 35 H, 35 J, 70, 35/71

[56] References Cited
UNITED STATES PATENTS

| | | | |
|---|---|---|---|
| 2,265,334 | 12/1941 | Armbruster | 35/35 J X |
| 2,520,649 | 8/1950 | Northrop | 35/35 R |
| 3,307,274 | 3/1967 | Glaser | 35/35 C |
| 3,333,351 | 8/1967 | Williams | 35/35 J |
| 3,453,750 | 7/1969 | Rapaport | 35/71 X |
| 3,616,551 | 11/1971 | Conrad | 35/35 J |

FOREIGN PATENTS OR APPLICATIONS

| | | | |
|---|---|---|---|
| 767,299 | 1/1957 | United Kingdom | 35/71 |
| 749,444 | 5/1956 | United Kingdom | 35/35 J |

OTHER PUBLICATIONS

Popular Science Magazine, "Alphabet Blocktrain" Nov. 1946, p. 151.

Primary Examiner—Wm. H. Grieb
Attorney, Agent, or Firm—C. Walter Mortenson

[57] ABSTRACT

An educational device is provided by this invention for use in teaching persons to read and to write. A plurality of block-like elements is provided, each of which contains thereon a letter or a group of letters and each of which contains a portion of a locking mechanism that affords its locking to another of said elements only if the two elements will match to spell a word or a part of a word. Each of the elements also has a base portion which allows the element to be positioned in a straight line with the other elements which base portion is representative of a line on a sheet of paper on or from which the person being taught would be writing or reading. It is preferred that the lettering on each of the elements be embossed and each of the elements also contains a lettering in Braille corresponding to the normal lettering.

5 Claims, 5 Drawing Figures

PATENTED SEP 9 1975　　　　　3,903,617

EDUCATIONAL DEVICE

BACKGROUND OF THE INVENTION

In U.S. Pat. No. 3,616,551 there is disclosed a device which is made to lie flat much like ordinary written or printed matter, the device containing a base and letter-carrying elements. The letter-carrying elements are made up of letters or a combination of letters which are capable of being placed in or on a base that is representative of a line upon which writing is to be placed. While the device shown therein is most useful, there are a number of disadvantages attendant to it. One of these relates to the thinness of the device. While the thickness is such that the parts of the device are three-dimensional, the life of the device is shortened by the thinness thereof and difficulty has been encountered by pupils in handling the parts. While the device could be made larger and thicker to overcome such disadvantages, it has also become apparent that there is a need for a device which affords parts of words that can be fitted with other parts of words only if they have a co-acting intermeshing locking means. Further, the devices referred to in the above patent do not provide elements which can lead only to correctly spelled words.

OBJECTIVES OF THE INVENTION

One objective of this invention is the provision of a teaching aid which enhances the correct spellings of words by the pupil and the proper decoding of vocabulary in reading skills. Another purpose is to provide an educational device which is readily handled and has a long life. A still further aim is providing a teaching device which has on it the shape of the letter or letters so that a pupil, whether he is blind or not, can readily trace and feel the letters in the given shape and learn the sounds for this letter or letters. A still further objective is the provision of a device for teaching blind people to read and to write. These and other objectives will appear hereinafter.

SUMMARY OF THE INVENTION

The above objectives are accomplished by the provision of a block-like element which contains on it in a raised fashion a letter or a group of letters. The embossing is such that a user can feel the shape of the embossed material. That material also has, in a preferred embodiment, its counterpart in Braille. Further, it will be appreciated that there is a plurality of block-like elements, all providing a large variety of letters or groups of letters. Also, the block-like elements contain a portion of a locking mechanism that will mesh with or lock with another such locking mechanism on another element only if the meshing will lead ultimately to the correct spelling or sounding of a word. Some elements have only one locking device, and there are present blocks that have two locking mechanisms. The latter blocks bear letters which are usually found within a word. The blocks that have only one locking mechanism contain letters or groups of letters that are found at the beginning or at the end of the words being taught.

This invention will be further understood by reference to the discussion below and to the drawings, all of which are not limitative but are given for illustrative purposes only. The drawings are as follows.

Figure 1:
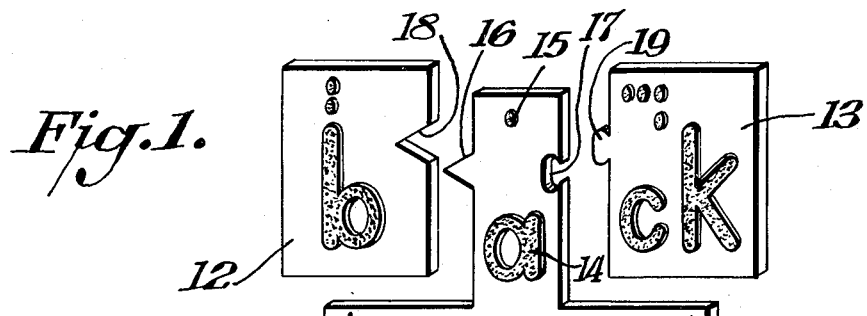
FIG. 1 is a front view of three block-like elements of this invention illustrating their use in forming a certain word.

With reference to FIG. 1, the center block element 10 presents base line portions 11 which are adapted to receive letters 12 and 13. The center element 10 bears on it the letter "a" which is embossed as shown at 14, and it also presents the letter "a" in Braille, also embossed as shown at 15. There are two locking mechanisms on block 10, being designated as 16 and 17. Mechanism 16 will accept only a counterpart locking mechanism 18 as shown on block 12. This is shown to bear the embossed letter "b" in script and in Braille. Similarly, the mechanism 17 will accept counterpart locking mechanism 19 on block 13. This block bears the embossed letters "ck" in script and in Braille, these two letters being frequently found together at the ends of many words such as "pack," "track," "crack" and the like. Thus, it will be appreciated that a reading-spelling kit within this invention will contain a plurality of block elements such as block 13, a plurality of such elements as block 10 and such elements as block 12, and that even though there is present a wide variety of letters, all of the blocks will be so chosen and so engineered that only correct spellings of words will result when the pupil intermeshes the various blocks.

Figure 2:
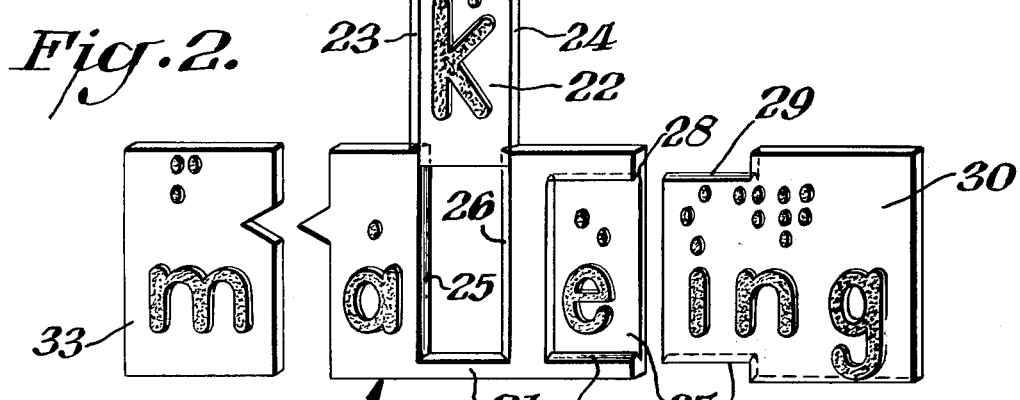
FIG. 2 is a front view of a variety of block-like elements of this invention illustrating the formation of other words.

In FIG. 2, the block element 20 which contains the aspects of the base line at 21 is an element that allows for the insertion of a lettered block between fixed letters such as the letters "a" and "e ". These two letters occur frequently within a word such as "make," "bake," "date," "late," "lame," and "quake," among many others. Thus, such a block as element 22 bearing the embossed letter "k," both in script and in Braille, is readily inserted between those vowels. It should be noted that again the locking mechanism is peculiar so that the insertion is limited to only an element such as block 22 that bears the corresponding intermeshing or dovetailing locking mechanisms 23 and 24.

The wedge 23 is designed to fit in groove 25, while the groove 24 receives wedge-like element 26. If desired, the block element 20 can contain a removable section rather than the fixed section showing the "e." As shown in FIG. 2, at 27, the "e" is actually a fixed portion of block element 20 and it is so designed that there is a recess in front of it which has, for example, at the top at 28 a groove adapted to receive a wedge such as that at 29 on block 30, and it has at the bottom a wedge 31 adapted to receive the groove 32 at the bottom of block 30. Upon insertion of block 30, the fixed letter "e" is, of course, covered up. It is readily understood that the group of letters "ing" occurs very frequently and the configurations shown in FIG. 2 illustrate the teaching of the spelling of the verb "make" and its conversion to the participle "making." The "ing" in Braille has a shortened, closely positioned form which can be placed as desired on the devices of this invention. Again, of course, it should be appreciated that there will be supplied block elements like 33 but bearing an embossed letter such as "t," both in script and in Braille to teach the spelling or reading of "take" and "taking." Comparison of the block element 12 with the letter "b" on it with that of block element 33 shows that the pupil will learn how to spell "bake" and "baking," the block elements 12 and 33 having the same structure.

Figure 3:
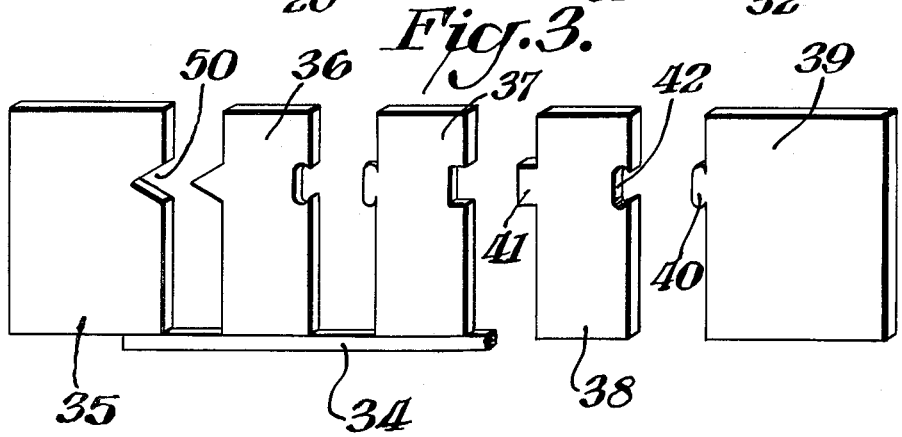
FIG. 3 is a front view showing a plurality of other block-like elements with a different base portion, the lettering being omitted for convenience.

For further illustration, there is shown in FIG. 3 a base element 34 which has a groove section which may be flat, as shown, or may be grooved, if desired. This base element is shown in broken form to indicate that it can be of any length desired capable of being placed on base element 34 or the plurality of blocks 35, 36, 37, 38 and 39 which are unlettered for convenience. This assembly is shown simply to illustrate how the structures are adapted to intermesh in a variety of ways. It should be noticed that block element 35 which appears at the beginning of a word has only one locking mechanism 50 and that the block element 39 which appears at the end of the word similarly has only one locking mechanism 40. The blocks 36, 37 and 38, all of which are contained within the words, each contains two locking mechanisms such as 41 and 42 on block element 38.

Figures 4, 5:
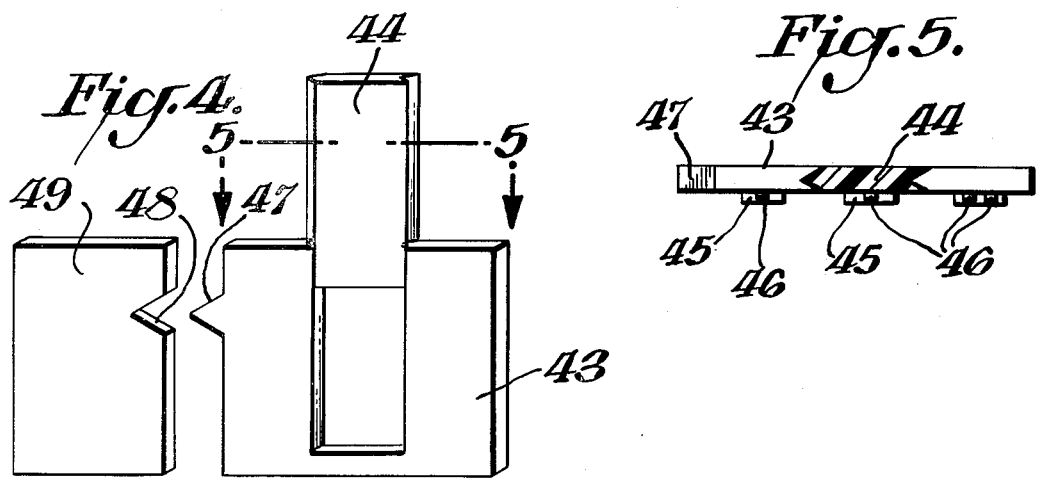
FIG. 4 is a front view showing intermeshing of different locking elements of this invention relative to a base structure contained in one of the elements.
FIG. 5 is taken on a line 5—5 of FIG. 4.

In FIGS. 4 and 5 there is shown in more detail a block element 43 which is similar to block element 20 except that it is directed towards four-letter words. Here again, the insertable element shown at 44 is tongue-in-groove like element 23 and this tongue-in-groove connection is shown in more detail in FIG. 5. While the letters have been omitted for convenience in FIG. 4, the embossing is shown in FIG. 5. At 45 one can see the script letter in embossment, while at 46 one is shown the embossed Braille. Again, the element 43 will contain protuberance 47 to dovetail with groove 48 in the beginning letter contained on block 49.

From the above, it can be seen that a pupil having the use of a kit containing a plurality of block elements before him has the possibility of learning a very large number of words very quickly and efficiently. The teacher and the pupil can start out with very simple words and pass from those to words of greater length and greater complexity. There will be present a number of suffixes such as "ing," "es," and "ed," and also present will be a plurality of long vowel combinations such as "ue," "ae," "ie," "ai," and "ee," among many others. Present also will be a plurality of blocks each of which will carry a blend of letters. Such blends will be like "sp," "thr," "sm," "str," "st," "sn," and the like.

It should also be understood that vowel variance such as "igh," "eigh," "are" will be present along with diphthongs such as "oi" and "ou" and other letter groupings that are frequently encountered such as in "in," "at," "ob." The kit will also contain blocks that bear single letters as shown in the drawings and discussed above and also the vowels separately. As a result of the principles of this invention, new visual aids are made available so that the learner can not only learn to spell with ease and flexibility, but he can actually trace the letters or the groups of letters with his hands, either as the letters are written in script or as they are presented in Braille.

While the invention has been disclosed herein in connection with certain embodiments and certain structural and procedural details, it is clear that changes, modifications or equivalents can be used by those skilled in the art; accordingly, such changes within the principles of the invention are intended to be included within the scope of the claims below.

I claim:

1. An educational device for use in teaching spelling, which device comprises a base structure and a plurality of block-like elements, each element containing thereon a letter or a group of letters and containing a locking mechanism to afford its locking with another element only if the locking mechanisms match to spell any word or a part of any word and each element being capable of being placed in spelling relationship with other of said elements on said base structure that is representative of a line, there being among the plurality of block-like elements a plurality of different locking mechanisms of which only like locking mechanisms can lock together, thereby assuring correct matching in spelling.

2. An educational device in accordance with claim 1 in which said letters or said groups of letters are embossed on said block-like elements.

3. An educational device in accordance with claim 1 in which said letters or groups of letters when positioned on said base structure form a second element which can be moved about as a unit.

4. An educational device in accordance with claim 1 in which each block-like element bearing a letter or a group of letters also has on it the corresponding lettering in Braille.

5. An educational device in accordance with claim 1 in which at least one of said block-like elements and said base structure are unitary.

* * * * *